(12) United States Patent
Bizub (10) Patent No.: US 9,695,761 B2
(45) Date of Patent: Jul. 4, 2017

(54) SYSTEMS AND METHODS TO DISTINGUISH ENGINE KNOCK FROM PISTON SLAP

(71) Applicant: General Electric Company, Schenectady, NY (US)

(72) Inventor: Jeffrey Jacob Bizub, Milwaukee, WI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 190 days.

(21) Appl. No.: 14/644,526

(22) Filed: Mar. 11, 2015

(65) Prior Publication Data

US 2016/0265454 A1     Sep. 15, 2016

(51) Int. Cl.
| | |
|---|---|
| *F02D 35/02* | (2006.01) |
| *G01L 23/22* | (2006.01) |
| *F02D 41/22* | (2006.01) |
| *F02P 5/152* | (2006.01) |
| *F02D 41/14* | (2006.01) |
| *F02D 41/28* | (2006.01) |

(52) U.S. Cl.
CPC ........... *F02D 35/027* (2013.01); *F02D 35/02* (2013.01); *F02D 35/023* (2013.01); *G01L 23/221* (2013.01); *G01L 23/226* (2013.01); *F02D 41/22* (2013.01); *F02D 2041/1432* (2013.01); *F02D 2041/288* (2013.01); *F02D 2200/025* (2013.01); *F02P 5/152* (2013.01); *G01L 23/22* (2013.01)

(58) Field of Classification Search
CPC ...... F02D 35/027; F02D 35/023; F02D 35/02; G01L 23/221; G01L 23/22

USPC .......................................... 701/111; 73/35.03
See application file for complete search history.

(56) References Cited

U.S. PATENT DOCUMENTS

| | | | |
|---|---|---|---|
| 4,364,260 A * | 12/1982 | Chen | ..................... G01L 23/225 73/35.03 |
| 4,643,023 A * | 2/1987 | Capps | ................... G01M 15/12 73/114.07 |
| 5,029,565 A | 7/1991 | Talbot | |
| 5,111,790 A | 5/1992 | Grandy | |
| 5,115,778 A | 5/1992 | Holroyd | |
| 5,119,783 A | 6/1992 | Komurasski | |

(Continued)

FOREIGN PATENT DOCUMENTS

| | | |
|---|---|---|
| CN | 203480037 | 3/2014 |
| DE | 102004057261 A1 | 6/2006 |

(Continued)

OTHER PUBLICATIONS

European Search Report and Written Opinion issued in connection with corresponding EP Application No. 16159267 on Jul. 22, 2016.

(Continued)

*Primary Examiner* — Mahmoud Gimie
(74) *Attorney, Agent, or Firm* — Fletcher Yoder, P.C.

(57) ABSTRACT

A method of distinguishing piston slap from engine knock in a reciprocating device includes obtaining a fundamental frequency of a cylinder, the cylinder having a thrust face and an anti-thrust face, receiving a first signal from a first knock sensor mounted on the cylinder, and identifying piston slap by evaluating whether a first plurality of amplitudes of the first signal at the fundamental frequency and one or more harmonic frequencies of the fundamental frequency exceed a piston slap threshold value.

17 Claims, 6 Drawing Sheets

(56) References Cited

U.S. PATENT DOCUMENTS

| | | |
|---|---|---|
| 5,241,480 A | 8/1993 | Takaku et al. |
| 5,257,533 A | 11/1993 | Imada |
| 5,337,240 A | 8/1994 | Nakagawa et al. |
| 5,339,245 A | 8/1994 | Hirata et al. |
| 5,361,213 A | 11/1994 | Fujieda et al. |
| 5,392,642 A | 2/1995 | Tao |
| 5,400,648 A | 3/1995 | Mahr |
| 5,408,863 A | 4/1995 | Sawyers et al. |
| 5,452,699 A | 9/1995 | Rossignol |
| 5,467,638 A | 11/1995 | Philipp |
| 5,594,649 A | 1/1997 | Cook et al. |
| 5,682,808 A * | 11/1997 | Nakada ............... F16J 1/02 123/193.6 |
| 5,693,936 A | 12/1997 | Komachiya et al. |
| 5,763,769 A | 6/1998 | Kluzner |
| 5,837,887 A | 11/1998 | Shibata et al. |
| 5,905,193 A | 5/1999 | Hashizume et al. |
| 5,932,801 A | 8/1999 | Akishita et al. |
| 5,934,256 A | 8/1999 | Wenzlawski et al. |
| 5,996,398 A | 12/1999 | Schleupen et al. |
| 6,073,602 A * | 6/2000 | Muta ............... F02F 3/0076 123/193.6 |
| 6,104,195 A | 8/2000 | Yoshinaga et al. |
| 6,273,064 B1 | 8/2001 | Scholl et al. |
| 6,276,334 B1 | 8/2001 | Flynn et al. |
| 6,330,877 B1 | 12/2001 | Nordin |
| 6,336,355 B1 | 1/2002 | Sasaki et al. |
| 6,550,311 B2 | 4/2003 | Sloboda |
| 6,598,468 B2 | 7/2003 | Zur Loye et al. |
| 6,662,781 B1 | 12/2003 | Torno et al. |
| 6,814,054 B2 | 11/2004 | Sauler et al. |
| 6,862,517 B2 | 3/2005 | Galtier |
| 6,885,932 B2 | 4/2005 | Liu et al. |
| 6,912,460 B2 | 6/2005 | Sauler et al. |
| 6,947,829 B2 | 9/2005 | Honda |
| 6,978,771 B2 | 12/2005 | Kuzuyama et al. |
| 6,990,947 B2 | 1/2006 | Kuzuyama et al. |
| 7,021,128 B2 | 4/2006 | Rauchfuss et al. |
| 7,027,909 B2 | 4/2006 | deBotton et al. |
| 7,181,338 B2 | 2/2007 | Takemura et al. |
| 7,191,658 B2 | 3/2007 | Oda et al. |
| 7,212,909 B2 | 5/2007 | Yoshino et al. |
| 7,243,529 B2 | 7/2007 | Takemura et al. |
| 7,246,600 B2 | 7/2007 | Nakashima et al. |
| 7,260,469 B2 | 8/2007 | Birk et al. |
| 7,263,872 B2 | 9/2007 | Danet et al. |
| 7,310,993 B2 | 12/2007 | Popielas et al. |
| 7,325,529 B2 | 2/2008 | Ancimer et al. |
| 7,356,404 B2 | 4/2008 | Takemura et al. |
| 7,376,506 B2 | 5/2008 | Schueler |
| 7,383,816 B2 | 6/2008 | Zurlo |
| 7,444,231 B2 | 10/2008 | Ancimer et al. |
| 7,444,236 B2 | 10/2008 | Wiles |
| 7,448,254 B2 | 11/2008 | Kurtz et al. |
| 7,546,198 B2 | 6/2009 | Remelman |
| 7,559,230 B2 | 7/2009 | Zimmer |
| 7,571,640 B2 | 8/2009 | Andrews |
| 7,628,253 B2 | 12/2009 | Jin et al. |
| 7,669,582 B2 | 3/2010 | Kaneko et al. |
| 7,712,450 B2 | 5/2010 | Sato et al. |
| 7,747,380 B2 | 6/2010 | Chauvin et al. |
| 7,810,469 B2 | 10/2010 | Vigild et al. |
| 7,823,561 B2 | 11/2010 | Omuro et al. |
| 8,000,884 B2 | 8/2011 | Aso et al. |
| 8,032,293 B2 | 10/2011 | Binder et al. |
| 8,068,972 B2 | 11/2011 | Auclair et al. |
| 8,078,389 B2 | 12/2011 | Huang et al. |
| 8,079,261 B2 | 12/2011 | Crickmore et al. |
| 8,108,131 B2 | 1/2012 | Huang et al. |
| 8,155,857 B2 | 4/2012 | Loeffler et al. |
| 8,250,905 B2 | 8/2012 | Schneider et al. |
| 8,260,531 B2 | 9/2012 | Yasuda |
| 8,316,824 B2 | 11/2012 | Hagari et al. |
| 8,342,011 B2 | 1/2013 | Galtier et al. |
| 8,359,909 B2 | 1/2013 | Duval et al. |
| 8,396,649 B2 | 3/2013 | Huang |
| 8,463,533 B2 | 6/2013 | Glugla et al. |
| 8,499,623 B2 | 8/2013 | Duval et al. |
| 8,528,521 B2 | 9/2013 | Landsmann et al. |
| 8,538,666 B2 | 9/2013 | Buslepp et al. |
| 8,606,484 B2 | 12/2013 | Ohata |
| 8,627,800 B2 | 1/2014 | Glugla et al. |
| 8,639,432 B2 | 1/2014 | Matsuo et al. |
| 8,677,975 B2 | 3/2014 | Auclair et al. |
| 8,680,707 B2 | 3/2014 | Childs et al. |
| 8,849,471 B2 | 9/2014 | Daniel et al. |
| 2006/0288982 A1 | 12/2006 | Kaneko et al. |
| 2009/0223280 A1 | 9/2009 | Masuda et al. |

FOREIGN PATENT DOCUMENTS

| | | |
|---|---|---|
| EP | 1447654 | 8/2004 |
| EP | 1698775 | 6/2006 |
| EP | 1840360 | 3/2007 |
| EP | 1988378 | 5/2008 |
| EP | 2128409 | 2/2009 |
| EP | 2128410 | 2/2009 |
| EP | 2339313 A1 | 6/2011 |
| EP | 2433355 | 3/2012 |
| EP | 2500705 | 9/2012 |
| GB | 2093121 A | 8/1982 |
| JP | 2005171900 A | 6/2005 |
| JP | 2007231903 A | 9/2007 |
| WO | WO2008000568 | 1/2008 |
| WO | WO2008059376 | 5/2008 |
| WO | WO2009106557 | 9/2009 |
| WO | 2010060445 A1 | 6/2010 |
| WO | WO2013015372 | 1/2013 |
| WO | WO2013026950 | 2/2013 |
| WO | WO2013118151 | 8/2013 |

OTHER PUBLICATIONS

U.S. Appl. No. 14/657,817, filed Mar. 13, 2015, Jeffrey Jacob Bizub.
U.S. Appl. No. 14/676,733, filed Apr. 1, 2015, Jeffrey Jacob Bizub.
U.S. Appl. No. 14/686,350, filed Apr. 14, 2015, Maruthi Narasinga Rao Devarakonda.
U.S. Appl. No. 14/695,335, filed Apr. 24, 2015, Jeffrey Jacob Bizub.
U.S. Appl. No. 14/705,081, filed May 6, 2015, Scott K. Mann.
U.S. Appl. No. 14/745,986, filed Jun. 22, 2015, Sandro Rivellini.
U.S. Appl. No. 14/754,128, filed Jun. 29, 2015, Jeffrey Jacob Bizub.
U.S. Appl. No. 14/790,785, filed Jul. 2, 2015, Pavan Chakravarthy Nandigama.
U.S. Appl. No. 14/796,934, filed Jul. 10, 2015, Jeffrey Jacob Bizub.
U.S. Appl. No. 14/820,156, filed Aug. 6, 2015, Jeffrey Jacob Bizub.
U.S. Appl. No. 14/918,013, filed Oct. 20, 2015, Venkatesh Raman.
U.S. Appl. No. 14/320,101, filed Jun. 30, 2014, Ryan Thomas Smith.
U.S. Appl. No. 14/587,407, filed Dec. 31, 2014, Jeffrey Jacob Bizub.
U.S. Appl. No. 14/587,412. filed Dec. 31, 2014, Jerry Jacob Bizub.
U.S. Appl. No. 14/587,434, filed Dec. 31, 2014, Jeffrey Jacob Bizub.
U.S. Appl. No. 14/591,192, filed Jan. 7, 2015, Jeffrey Jacob Bizub.
U.S. Appl. No. 14/592,547, filed Jan. 8, 2015, Jeffrey Jacob Bizub.
U.S. Appl. No. 14/600,674, filed Jan. 20, 2015, Scott K. Mann.
U.S. Appl. No. 14/609,416, filed Jan. 29, 2015, Jeffrey Jacob Bizub.
U.S. Appl. No. 14/614,237, filed Feb. 4, 2015, Pin Zeng.
U.S. Appl. No. 14/617,458, filed Feb. 9, 2015, Jeffrey Jacob Bizub.
U.S. Appl. No. 14/621,028, filed Feb. 15, 2015, Jeffrey Jacob Bizub.
U.S. Appl. No. 14/626,385, filed Feb. 19, 2015, Jeffrey Jacob Bizub.
U.S. Appl. No. 14/639,736, filed Mar. 5, 2015, Jeffrey Jacob Bizub.
Reduction Piston Slap Excitation by Optimizing Piston Profiles; Takayuki Koizumi et al,; Proc. of 2002 IMAC-XX: Conf. & Exposition on Structural Dynamics, Jun. 12-15, 2000.
VE Piston Dynamics; FEV Group, Inc.; available online; www.fev.com/what-we-do/software/virtual-engine-powertrain-dynamics-simulation/piston-dynamics-module; Jan. 1, 2015.
Diagnostic Internal Combustion Engine Based on Crankshaft Angular Acceleration; Binh Le Khac, Tuma J.; available online; www.researchgate.net, May 2012.

(56) References Cited

OTHER PUBLICATIONS

Bolt loosening detection using vibration characteristics of thin plate with piezoelectric elements;Takeshi Nakahara et al; Proc. of SPIE 5391, Smart Struc. & Materials, Jul. 2004.

\* cited by examiner

SYSTEMS AND METHODS TO DISTINGUISH ENGINE KNOCK FROM PISTON SLAP

BACKGROUND

The subject matter disclosed herein relates to knock sensors, and more specifically to knock sensors suitable for sensing engine knock and piston slap in combustion engines.

Combustion engines typically combust a carbonaceous fuel, such as natural gas, gasoline, diesel, and the like, and use the corresponding expansion of high temperature and pressure gases to apply a force to certain components of the engine, e.g., piston disposed in a cylinder, to move the components over a distance. Each cylinder may include one or more valves that open and close correlative with combustion of the carbonaceous fuel. For example, an intake valve may direct an oxidizer such as air into the cylinder, which is then mixed with fuel and combusted. Combustion fluids, e.g., hot gases, may then be directed to exit the cylinder via an exhaust valve. Accordingly, the carbonaceous fuel is transformed into mechanical motion, useful in driving a load. For example, the load may be a generator that produces electric power.

Knock sensors can be used to monitor multi-cylinder combustion engines. A knock sensor can be mounted to the exterior of an engine cylinder and used to determine whether or not the engine is running as desired. Sometimes a knock sensor detects piston slap and mistakes the piston slap for engine knock. When this occurs, the engine control system, which is connected to the knock sensor, may attempt to make adjustments to eliminate the engine knock it believes is happening, but is really piston slap. These adjustments may induce engine knock or otherwise make the engine run in an undesirable way. Thus, it would be desirable to have a way to distinguish piston slap from engine knock.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a method of distinguishing piston slap from engine knock in a reciprocating device includes obtaining a fundamental frequency of a cylinder, the cylinder having a thrust face and an anti-thrust face, receiving a first signal from a first knock sensor mounted on the cylinder, and identifying piston slap by evaluating whether a first plurality of amplitudes of the first signal at the fundamental frequency and one or more harmonic frequencies of the fundamental frequency exceed a piston slap threshold value.

In a second embodiment, a system includes a controller configured to control a reciprocating device, wherein the controller includes a processor configured to obtain a fundamental frequency of a cylinder, the cylinder including a thrust face and an anti-thrust face, receive a first signal from a first knock sensor disposed on the cylinder, and identify the presence of piston slap by evaluating whether a first plurality of amplitudes of the first signal at the fundamental frequency and one or more harmonic frequencies of the fundamental frequency exceed a piston slap threshold value.

In a third embodiment, a non-transitory computer readable medium comprising executable instructions that when executed cause a processor to obtain a fundamental frequency of a cylinder, the cylinder having a thrust face and an anti-thrust face, receive a first signal from a first knock sensor disposed on the thrust face of the cylinder, and identify the presence of piston slap by evaluating whether a first plurality of amplitudes of the first signal at the fundamental frequency and one or more harmonic frequencies of the fundamental frequency exceed a piston slap threshold value.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

When using knock sensors to monitor a reciprocating device (e.g., a combustion engine), the engine control unit (ECU) may make adjustments based on knock sensor measurements in order to improve how the engine runs. Piston slap occurs when the piston contacts or pushes against one side of the cylinder while moving within the cylinder during combustion. Piston slap may be the result of mismatched piston-cylinder combinations, worn out pistons, cylinders, rods and/or pins, insufficient lubrication, etc. Unlike engine knock, which may be eliminated by adjusting the operational parameters of the engine, piston slap is often due to worn parts and the fit between the piston and the cylinder. Thus, the ECU may be unable to avoid piston slap by adjusting the operational parameters of the engine. Because piston slap may occur at similar frequencies and have similar amplitudes to engine knock, the knock sensors may detect engine slap and mistake it for engine knock. The ECU may then make adjustments to the engine's operational parameters in an effort to avoid what the ECU thinks is engine knock, but is really piston slap. These adjustments to the engine's operational parameters may induce engine knock, or otherwise cause the engine to run in an undesirable way. As such, it would be beneficial to have a way to distinguish piston slap from engine knock.

Figure 1:
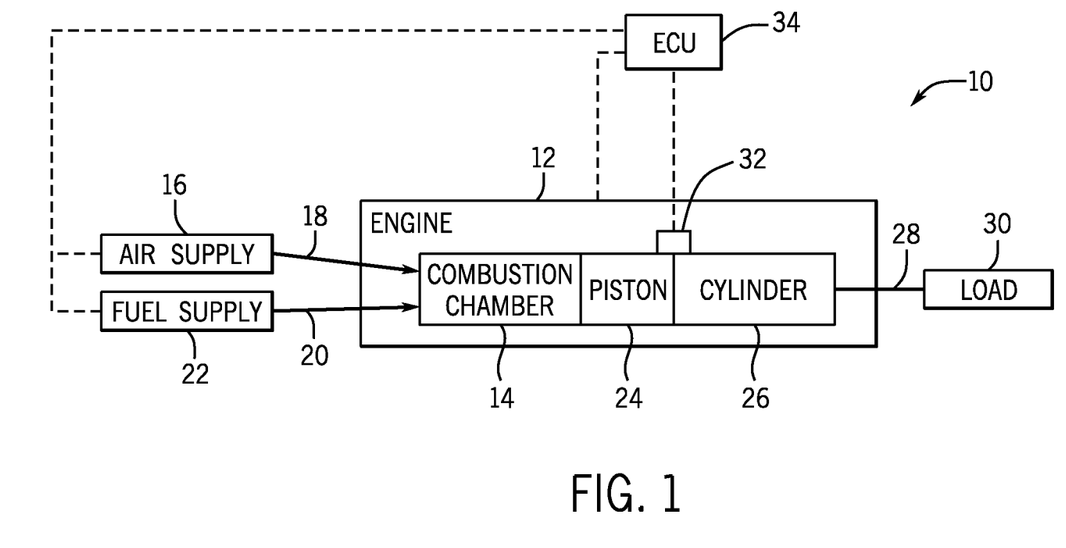
FIG. 1 is a block diagram of an embodiment of an engine driven power generation system in accordance with aspects of the present disclosure.

Turning to the drawings, FIG. 1 illustrates a block diagram of an embodiment of a portion of an engine driven power generation system 10. As described in detail below, the system 10 includes an engine 12 (e.g., a reciprocating internal combustion engine) having one or more combustion chambers 14 (e.g., 1, 2, 3, 4, 5, 6, 7, 8, 10, 12, 14, 16, 18, 20, or more combustion chambers 14). Though FIG. 1 shows a combustion engine 12, it should be understood that any reciprocating device may be used. An air supply 16 is configured to provide a pressurized oxidant 18, such as air, oxygen, oxygen-enriched air, oxygen-reduced air, or any combination thereof, to each combustion chamber 14. The combustion chamber 14 is also configured to receive a fuel 20 (e.g., a liquid and/or gaseous fuel) from a fuel supply 22, and a fuel-air mixture ignites and combusts within each combustion chamber 14. The hot pressurized combustion gases cause a piston 24 adjacent to each combustion chamber 14 to move linearly within a cylinder 26 and convert pressure exerted by the gases into a rotating motion, which causes a shaft 28 to rotate. Further, the shaft 28 may be coupled to a load 30, which is powered via rotation of the shaft 28. For example, the load 30 may be any suitable device that may generate power via the rotational output of the system 10, such as an electrical generator. Additionally, although the following discussion refers to air as the oxidant 18, any suitable oxidant may be used with the disclosed embodiments. Similarly, the fuel 20 may be any suitable gaseous fuel, such as natural gas, associated petroleum gas, propane, biogas, sewage gas, landfill gas, coal mine gas, for example.

The system 10 disclosed herein may be adapted for use in stationary applications (e.g., in industrial power generating engines) or in mobile applications (e.g., in cars or aircraft). The engine 12 may be a two-stroke engine, three-stroke engine, four-stroke engine, five-stroke engine, or six-stroke engine. The engine 12 may also include any number of combustion chambers 14, pistons 24, and associated cylinders (e.g., 1-24). For example, in certain embodiments, the system 10 may include a large-scale industrial reciprocating engine having 4, 6, 8, 10, 16, 24 or more pistons 24 reciprocating in cylinders 26. In some such cases, the cylinders and/or the pistons 24 may have a diameter of between approximately 13.5-34 centimeters (cm). In some embodiments, the cylinders and/or the pistons 24 may have a diameter of between approximately 10-40 cm, 15-25 cm, or about 15 cm. The system 10 may generate power ranging from 10 kW to 10 MW. In some embodiments, the engine 12 may operate at less than approximately 1800 revolutions per minute (RPM). In some embodiments, the engine 12 may operate at less than approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 12 may operate between approximately 750-2000 RPM, 900-1800 RPM, or 1000-1600 RPM. In some embodiments, the engine 12 may operate at approximately 1800 RPM, 1500 RPM, 1200 RPM, 1000 RPM, or 900 RPM. Exemplary engines 12 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example.

The driven power generation system 10 may include one or more knock sensors 32 suitable for detecting engine "knock" and/or other run characteristics of the engine 12. The knock sensor 32 may be any sensor configured to sense vibrations caused by the engine 12, such as vibration due to detonation, pre-ignition, and or pinging. The knock sensor 32 is shown communicatively coupled to a controller, engine control unit (ECU) 34. During operations, signals from the knock sensors 32 are communicated to the ECU 34 to determine if knocking conditions (e.g., pinging), or other behaviors exist. The ECU 34 may then adjust certain engine 12 parameters to ameliorate or avoid the undesirable conditions. For example, the ECU 34 may adjust ignition timing and/or adjust boost pressure to avoid knocking. As further described herein, the knock sensors 32 may additionally detect other vibrations beyond knocking, for example, piston slap.

Figure 2:
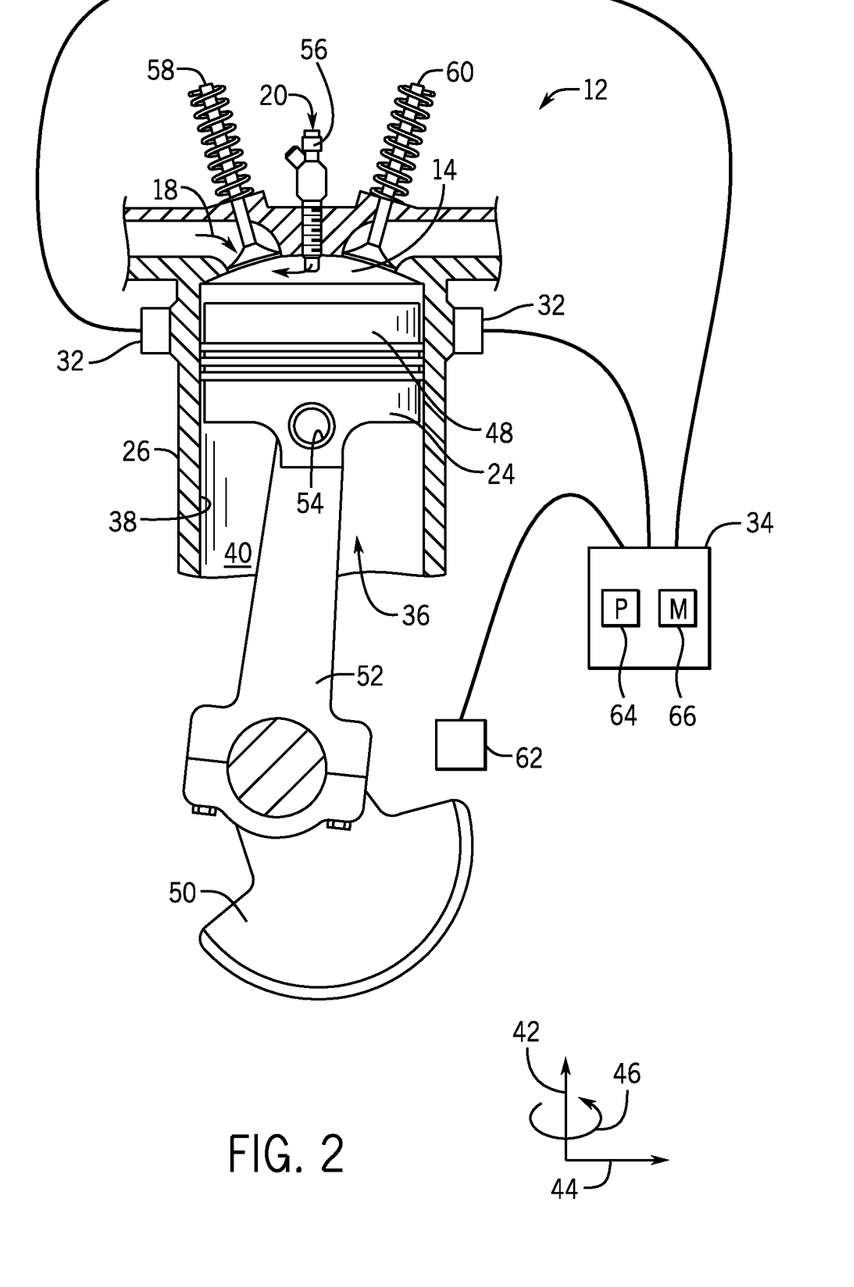
FIG. 2 is a side cross-sectional view of an embodiment of a piston assembly in accordance with aspects of the present disclosure.

FIG. 2 is a side cross-sectional view of an embodiment of a piston assembly 36 having a piston 24 disposed within a cylinder 26 (e.g., an engine cylinder) of the reciprocating engine 12. The cylinder 26 has an inner annular wall 38 defining a cylindrical cavity 40 (e.g., bore). The piston 24 may be defined by an axial axis or direction 42, a radial axis or direction 44, and a circumferential axis or direction 46. The piston 24 includes a top portion 48 (e.g., a top land). The top portion 48 generally blocks the fuel 20 and the air 18, or a fuel-air mixture, from escaping from the combustion chamber 14 during reciprocating motion of the piston 24.

As shown, the piston 24 is attached to a crankshaft 50 via a connecting rod 52 and a pin 54. The crankshaft 50 translates the reciprocating linear motion of the piston 24 into a rotating motion. As the piston 24 moves, the crankshaft 50 rotates to power the load 30 (shown in FIG. 1), as discussed above. As shown, the combustion chamber 14 is positioned adjacent to the top land 48 of the piston 24. A fuel injector 56 provides the fuel 20 to the combustion chamber 14, and an intake valve 58 controls the delivery of air 18 to the combustion chamber 14. An exhaust valve 60 controls discharge of exhaust from the engine 12. However, it should be understood that any suitable elements and/or techniques for providing fuel 20 and air 18 to the combustion chamber 14 and/or for discharging exhaust may be utilized, and in some embodiments, no fuel injection is used. In operation, combustion of the fuel 20 with the air 18 in the combustion chamber 14 cause the piston 24 to move in a reciprocating manner (e.g., back and forth) in the axial direction 42 within the cavity 40 of the cylinder 26.

During operations, when the piston 24 is at the highest point in the cylinder 26 it is in a position called top dead center (TDC). When the piston 24 is at its lowest point in the cylinder 26, it is in a position called bottom dead center (BDC). As the piston 24 moves from top to bottom or from bottom to top, the crankshaft 50 rotates one half of a revolution. Each movement of the piston 24 from top to bottom or from bottom to top is called a stroke, and engine 12 embodiments may include two-stroke engines, three-stroke engines, four-stroke engines, five-stroke engine, six-stroke engines, or more.

During engine 12 operations, a sequence including an intake process, a compression process, a power process, and an exhaust process typically occurs. The intake process enables a combustible mixture, such as fuel and air, to be pulled into the cylinder 26, thus the intake valve 58 is open and the exhaust valve 60 is closed. The compression process compresses the combustible mixture into a smaller space, so both the intake valve 58 and the exhaust valve 60 are closed. The power process ignites the compressed fuel-air mixture, which may include a spark ignition through a spark plug system, and/or a compression ignition through compression heat. The resulting pressure from combustion then forces the piston 24 to BDC. The exhaust process typically returns the piston 24 to TDC while keeping the exhaust valve 60 open. The exhaust process thus expels the spent fuel-air mixture through the exhaust valve 60. It is to be noted that more than one intake valve 58 and exhaust valve 60 may be used per cylinder 26.

The engine 12 may also include a crankshaft sensor 62, one or more knock sensors 32, and the engine control unit (ECU) 34, which includes a processor 64 and memory 66 (e.g., non-transitory computer readable medium). The crankshaft sensor 62 senses the position and/or rotational speed of the crankshaft 50. Accordingly, a crank angle or crank timing information may be derived. That is, when monitoring combustion engines, timing is frequently expressed in terms of crankshaft 50 angle. For example, a full cycle of a four stroke engine 12 may be measured as a 720° cycle. The one or more knock sensors 32 may be a Piezo-electric accelerometer, a microelectromechanical system (MEMS) sensor, a Hall effect sensor, a magnetostrictive sensor, and/or any other sensor designed to sense vibration, acceleration, sound, and/or movement. In other embodiments, sensor 32 may not be a knock sensor in the traditional sense, but any sensor that may sense vibration, pressure, acceleration, deflection, or movement.

Because of the percussive nature of the engine 12, the knock sensor 32 may be capable of detecting signatures even when mounted on the exterior of the cylinder 26. The one or more knock sensors 32 may be disposed at many different locations on the engine 12. For example, in FIG. 2, two knock sensors 32 are shown, one on either side of the cylinder 26. In other embodiments, only one knock sensor 32 may be used on the side of the cylinder 26. In order to best detect piston slap, the knock sensor 32 may be disposed on the thrust side of the cylinder 26 and oriented perpendicular to piston travel. In still other embodiments, the knock sensor 32 may be disposed on the head of the cylinder 26. Additionally, in some embodiments, a single knock sensor 32 may be shared, for example, with one or more adjacent cylinders 26. In other embodiments, each cylinder 26 may include one or more knock sensors 32 on either or both sides of a cylinder 26. The crankshaft sensor 62 and the knock sensor 32 are shown in electronic communication with the engine control unit (ECU) 34. The ECU 34 includes a processor 64 and a memory 66. The memory 66 may store non-transitory code or computer instructions that may be executed by the processor 64. The ECU 34 monitors and controls and operation of the engine 12, for example, by adjusting spark timing, valve 58, 60 timing, adjusting the delivery of fuel and oxidant (e.g., air), and so on.

Engine knock is the premature combustion of fuel outside the envelope of normal combustion. In some cases, the ECU 34 may reduce or avoid engine knock when it occurs by adjusting the operating parameters of the engine. For example, the ECU 34 may adjust the air/fuel mix, ignition timing, boost pressure, etc. in an effort to reduce or avoid engine knock.

Figure 3:
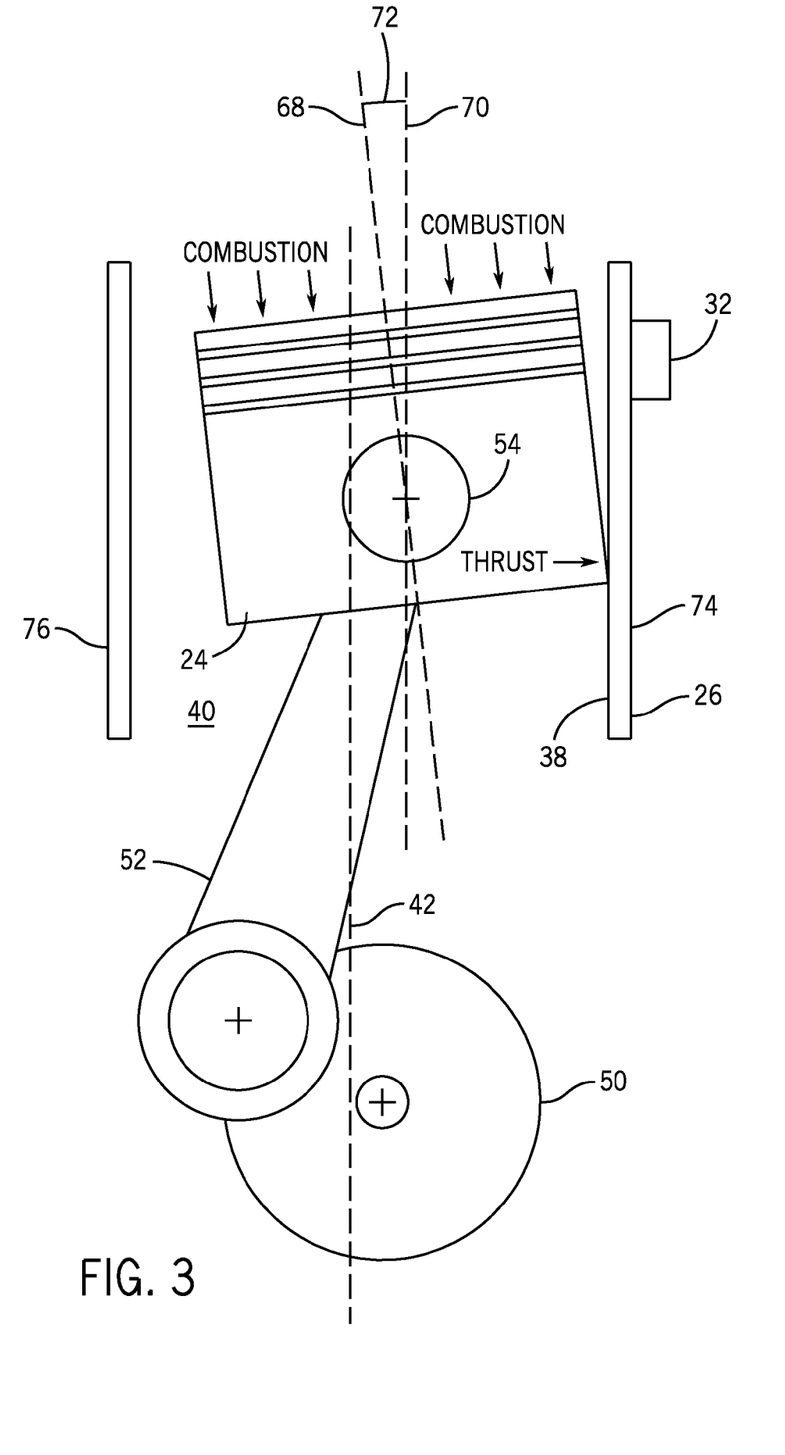
FIG. 3 is a side cross-sectional view of an embodiment of a piston illustrating piston slap in accordance with aspects of the present disclosure.

FIG. 3 is a side cross-sectional view of an embodiment of a piston assembly 36 illustrating piston slap. Piston slap occurs when there is too much space between the piston 24 and the inner annular wall 38 of the cylinder 26. When an engine is operating as desired (i.e., no piston slap), the piston moves straight up and down in the cylindrical cavity 40 in a reciprocating fashion such that the actual piston axis 68 is parallel with the axial axis 42 of the cylinder 26. However, when the clearances between the piston 24 and the inner annular wall 38 are too large, the piston 24 may tilt and rub against the side of the cylinder 26, applying a thrust to the inner annular wall 38 of one side of the cylinder 26. The force from combustion pushes down on the piston 24, but because the connecting rod 52 is not in line with the axial axis 42 of the cylinder, and because there is additional play between the piston 24 and the cylinder 26, the piston 26 tilts to one side such that the actual piston axis 68 deviates from the desired piston axis 70 by an angle 72. The side of the cylinder 26 against which the piston 24 rubs is called the thrust face 74, and the other side of the cylinder 26 is called the anti-thrust face 76. This tilting of the piston 24 and subsequent rubbing against one side of the cylinder 26 is known as piston slap.

A knock sensor 32 mounted on the thrust face 74 of the cylinder 26 and oriented perpendicular to piston 24 travel, as shown in FIG. 3, may detect piston slap at similar frequencies and amplitudes as engine knock. As a result, knock sensors 32 mounted in this configuration and ECUs 34 may detect piston slap, but mistake it for engine knock. When the ECU 34 mistakes piston slap for engine knock, the ECU 34 may try to adjust the operating parameters of the engine 12 (e.g., ignition timing, boost pressure, etc.) in order to avoid the engine knock. Such changes may induce engine knock where it was not previously happening, or otherwise degrade how the engine 12 is running. To avoid this, the ECU 34 may be configured to distinguish between engine knock and piston slap and have distinct reactions to each. For example, the ECU 34 may react to detecting piston slap by warning the user that something may be wrong with the engine. On the other hand, when the ECU 34 detects engine knock, the ECU 34 may attempt to avoid the engine knock by adjusting the operational parameters of the engine.

Figure 4:
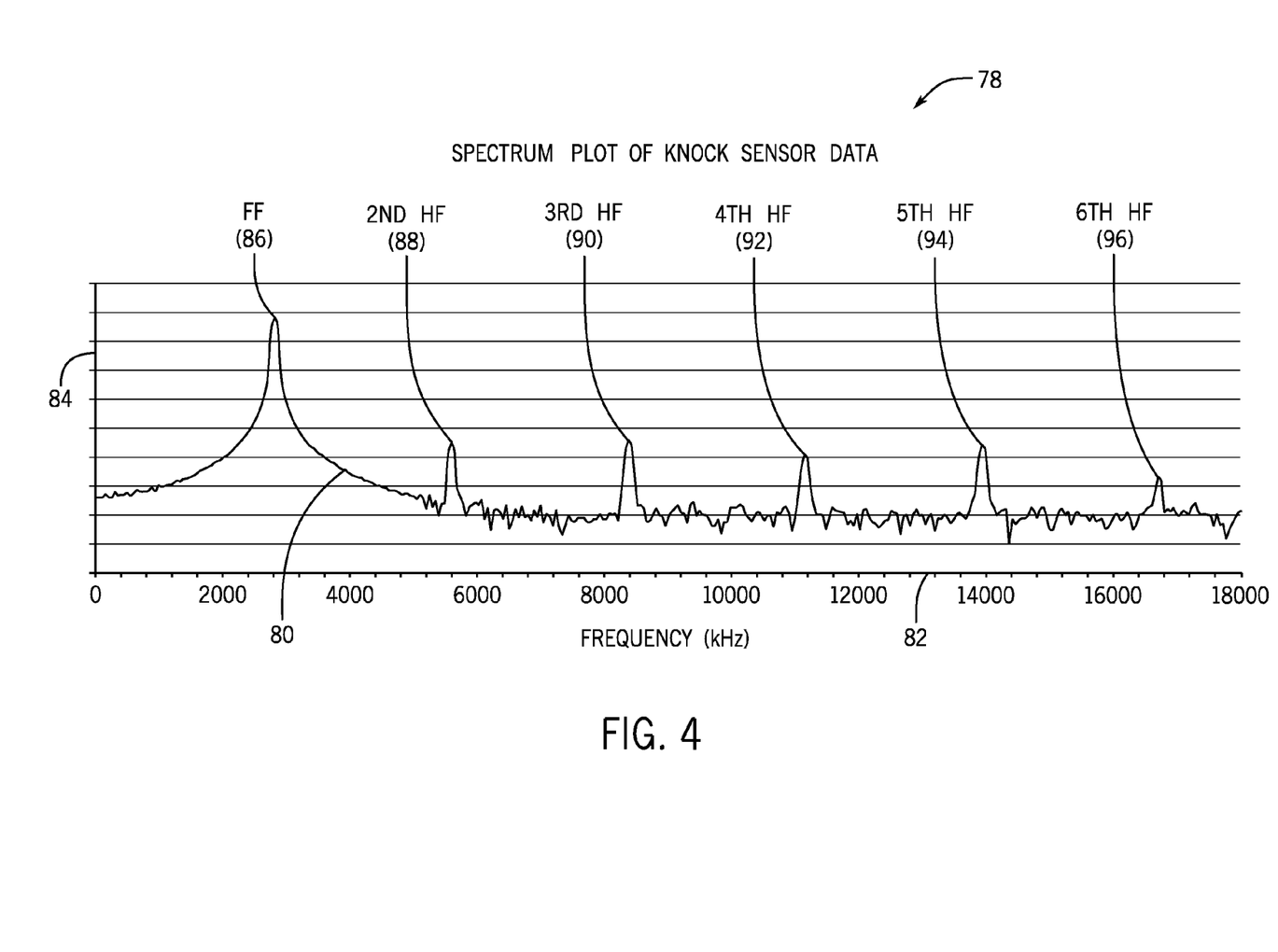
FIG. 4 is an embodiment of a sample spectrum plot of data captured by a knock sensor in accordance with aspects of the present disclosure.

An embodiment of a sample spectrum plot 78 of data 80 captured by a knock sensor 32 disposed on the side of the cylinder is shown in FIG. 4. The horizontal axis 82 of the spectrum plot is frequency (in kHz), and the vertical axis 84 represents amplitude. Because piston slap is caused by the piston 24 rubbing against the side of the cylinder 26, the rubbing excites the cylinder 26, causing it to resonate at its fundamental frequency and the various harmonics of that fundamental frequency.

The fundamental frequency of a cylinder in a combustion engine can be found by using Draper's equation, or experimentally. Draper's equation is as follows:

$$f_{m,n} = \frac{c_0 \sqrt{T} \, n_{m,n}}{\pi B}, \tag{1}$$

where $f_{m,n}$ is the resonant frequency of the cylinder, $n_{m,n}$ the non-dimensional mode number, $c_0$ is the phase velocity constant, T is temperature of the combustion mixture, B is the cylinder bore diameter, and m,n are the radial and circumferential mode numbers. Once determined, the fundamental frequency of the cylinder 26 may be provided as input to the ECU 34 or predetermined and stored on the memory 66 to be obtained and/or processed by the processor 64.

Line 86 represents the fundamental frequency of the cylinder 26, in this particular embodiment about 2783 Hz. It should be understood that this is merely an example and that the fundamental frequency 86 will change from cylinder 26 to cylinder. Harmonics occur at multiple whole integers of the fundamental frequency 86. For example, in this embodiment, the second harmonic frequency 88 occurs at about 5566 Hz, or twice the fundamental frequency. Similarly, the third harmonic frequency 90 occurs at about 8350 Hz, the fourth harmonic frequency 92 at about 11133 Hz, the fifth harmonic frequency 94 at about 13916 Hz, the sixth harmonic frequency 96 at about 16699 Hz, and so on. Again, these values are merely an example and specific to the cylinder 26 of the present embodiment. The fundamental frequency 86 and the various harmonics 88, 90, 92, 94, and 96 will vary depending upon the cylinder 26. The memory 66 may store a piston slap threshold value, which may be in the form of a raw amplitude value, a percentage increase, or some other value. When the amplitude at a frequency exceeds the threshold value, piston slap is determined to be present. Engine knock, on the other hand, may occur at both whole integers and non-integers. Given that the amplitude of piston slap decreases as the harmonic ratios go up, and amplitude of engine knock does not decrease, the ECU 34 can distinguish piston slap from engine knock at multiple whole integers of the fundamental frequency by determining whether the amplitude decreases as the harmonic count increases.

Figure 5:
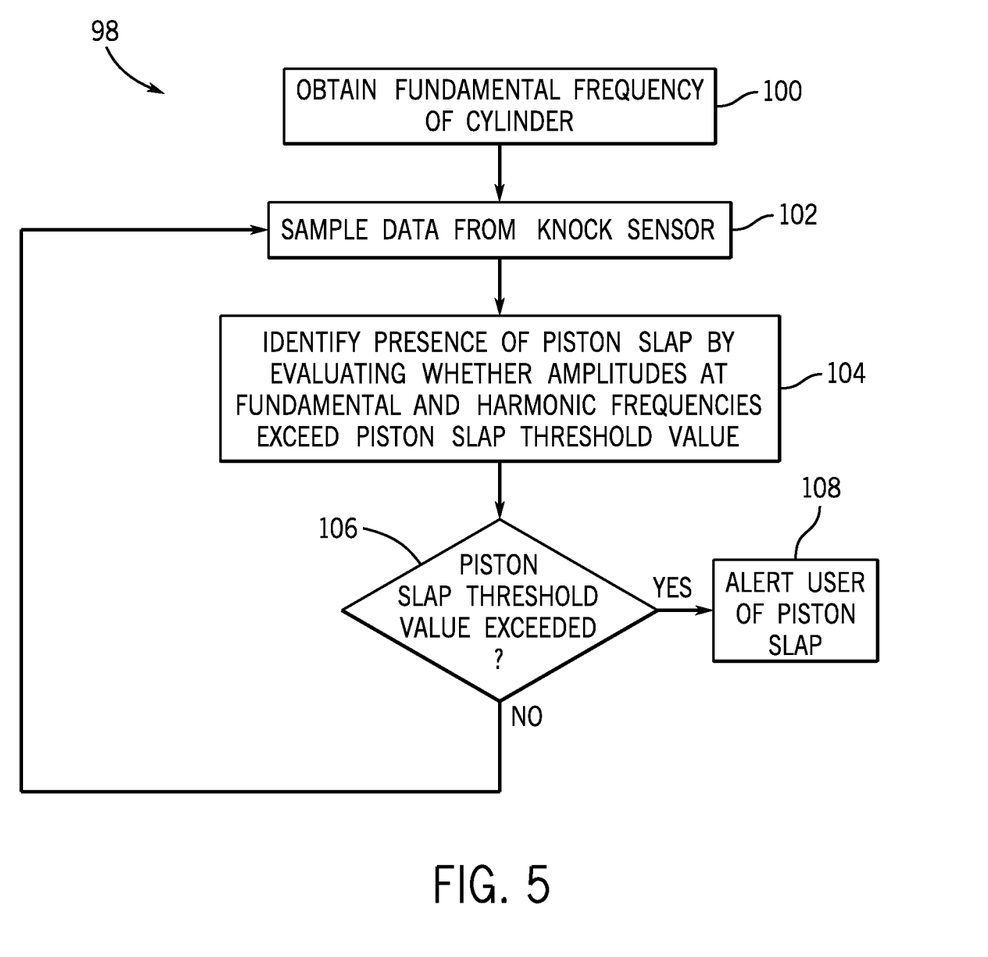
FIG. 5 is a flow chart showing an embodiment of a process for distinguishing piston slap from engine knock using a single knock sensor in accordance with aspects of the present disclosure.

FIG. 5 is a flow chart showing an embodiment of a process 98 for distinguishing piston slap from engine knock using a single knock sensor 32. The process 98 may be implemented as computer instructions or executable code stored in the memory 66 and executable by the processor 64 of the ECU 34. In block 100, the process 98 obtains (e.g., receives, from a user or another device, accesses from memory 66, or some other method) the fundamental frequency of the cylinder 26.

In block 102, a sample of data is sampled using the knock sensor 32. For example, the one or more knock sensors 32 collect data and then transmit the data to the ECU 34. In the present embodiment, a single knock sensor 32 is mounted on the thrust face 74 of the cylinder 26 and oriented perpendicular to the direction of piston 24 travel. An embodiment using two knock sensors 32 on a single cylinder 26 will be described later.

In block 104, the process 98 identifies piston slap at the fundamental frequency 86 of the cylinder 26 and the harmonic frequencies of the fundamental frequency 86 of the cylinder 26. This may involve referencing a look up table stored on the memory 66 and comparing the amplitude within one or more windows of frequencies to the look up table. Block 104 may also involve determining whether the amplitude exceeds a piston slap threshold value stored in the memory 66. Block 104 may also involve applying one or more filters to the signal. Filters used by the process 98 may include low pass filters, high pass filters, band pass filters, and the like. The harmonic frequencies of the cylinder 26 are multiples of the fundamental frequency 86 of the cylinder 26. For example, the second harmonic frequency 88 is twice the fundamental frequency 86 of the cylinder 26. In block 104, the process 98 may analyze or evaluate the fundamental frequency 86, as well as the second harmonic 88, third harmonic 90, fourth harmonic 92, fifth harmonic 94, sixth harmonic 96, and so on. The process 98 may analyze or evaluate a range of frequencies surrounding the frequency in question. For example, the process 98 may analyze or evaluate frequencies in the range of ±0.5%, ±1%, ±2%, or ±5% of the frequency in question. Block 104 may include comparing the amplitude to a look up table or a piston slap threshold value store in memory 66.

In decision 106, the process 98 compares the amplitudes at the given frequencies to one or more piston slap threshold values store in memory 66 or to a look up table. If the process 98 determines that piston slap is present (e.g., the amplitude exceeds the piston slap threshold), the process 98 moves to block 108 and alerts the user that piston slap is occurring. The user may be alerted in a number of different ways, including proprietary error codes, via a display, sounds or audio notifications, on a display, via text, and the like. In some embodiments the ECU may shift into another mode of operation (e.g., safe run mode) that reduces the likelihood of piston slap causing excessive damage. The user may then decide whether or not to shut down the engine 12 and investigate the piston slap further.

Figure 6:
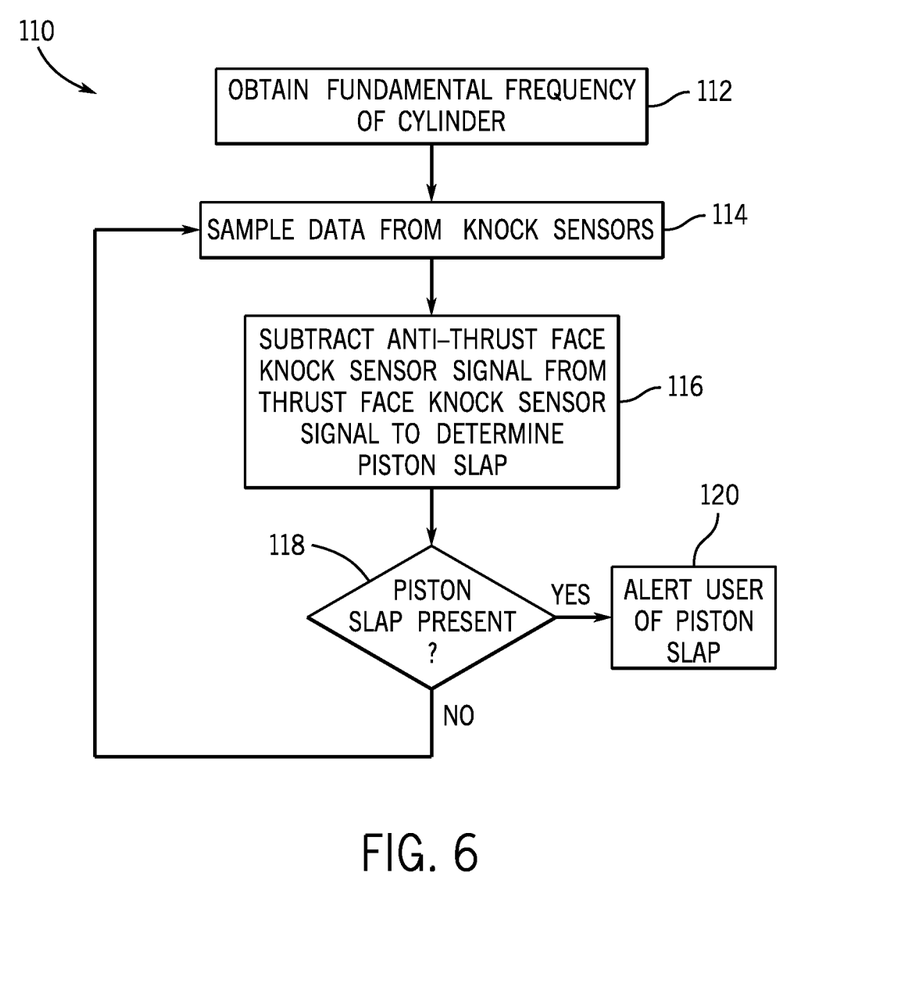
FIG. 6 is a flow chart showing an embodiment of a process for distinguishing piston slap from engine knock using two knock sensors in accordance with aspects of the present disclosure.

FIG. 6 is a flow chart showing an embodiment of a process 110 for distinguishing piston slap from engine knock using two knock sensors 32. It should be understood, however, that more than two knock sensors may be utilized. The process 110 may be implemented as computer instructions or executable code stored in the memory 66 and executable by the processor 64 of the ECU 34. In block 112, the process 110 obtains (e.g., receives, from a user or another device, accesses from memory 66, or some other method) the fundamental frequency of the cylinder 26.

In block 114, a sample of data is taken using the knock sensors 32. For example, the knock sensors 32 collect data and then transmit the data to the ECU 34. In the present embodiment, two knock sensors 32 are mounted on a single cylinder 26. One knock sensor 32 is mounted on the thrust face 74 of the cylinder 26 and oriented perpendicular to the direction of piston 24 travel. This knock sensor, due to its placement on the cylinder 26, is capable of detecting both engine knock and piston slap. The second knock sensor 32 is placed on the anti-thrust face 76 of the cylinder and only detects engine knock.

In block 116, the signal from the knock sensor 32 mounted on the anti-thrust face 76 of the cylinder 26 is subtracted from the signal of the knock sensor 32 mounted on the thrust face 74 of the cylinder 26. Because the knock sensor 32 on the thrust face 74 detects piston slap and the knock sensor 32 mounted on the anti-thrust face 76 does not, subtracting one from the other results in a piston slap signal. It should be understood, however, that some signal pre-processing may be required to "clean up" and/or smooth out the signals from the two knock sensors 32 such that subtracting one from the other results in a clean piston slap signal.

In decision 118, if no piston slap is present, the process 110 returns to block 114 and samples more data. If piston slap is present, the process 110 moves to block 120 and alerts the user that piston slap is occurring. The user may then decide whether or not to shut down the engine 12 and investigate the piston slap further. The user may be alerted in a number of different ways, including proprietary error codes, via a display, sounds or audio notifications, on a display, via text, and the like. In some embodiments the ECU may shift into another mode of operation (e.g., safe run mode) that reduces the likelihood of piston slap causing excessive damage.

Technical effects of the disclosed embodiments include systems and methods for distinguishing engine knock from piston slap in a reciprocating device that include obtaining a fundamental frequency of a cylinder, the cylinder having a thrust face and an anti-thrust face, receiving a first signal from a first knock sensor mounted on the cylinder, and identifying piston slap by evaluating whether a first plurality of amplitudes of the first signal at the fundamental frequency and one or more harmonic frequencies of the fundamental frequency exceed a piston slap threshold value. Additionally, the technical effects of the disclosed embodiments may also include receiving data from a second knock sensor disposed on the anti-thrust face of the cylinder, and subtracting the signal of the second knock sensor from the signal of the first knock sensor to derive a piston slap signal.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of distinguishing engine knock from piston slap in a reciprocating device, comprising:
   obtaining a fundamental frequency of a cylinder, the cylinder comprising a thrust face and an anti-thrust face;
   receiving a first signal from a first knock sensor disposed on a cylinder;
   determining whether piston slap is present, by evaluating whether a plurality of amplitudes of the first signal at the fundamental frequency and one or more harmonic frequencies of the fundamental frequency exceed a piston slap threshold value; and
   determining whether engine knock is present, by evaluating whether the plurality of amplitudes do not decrease as the one or more harmonic frequencies increase.

2. The method of claim 1, wherein the one or more harmonic frequencies are whole integer multiples of the fundamental frequency.

3. The method of claim 2, wherein the one or more harmonic frequencies comprise first, second, third, fourth, fifth, and sixth harmonic frequencies.

4. The method of claim 1, wherein the first knock sensor is disposed on the thrust face of the cylinder, and is oriented perpendicular to an axis of piston travel within the cylinder.

5. The method of claim 1, further comprising providing a user perceptible indication of the presence of piston slap.

6. The method of claim 1 further comprising identifying that piston slap is not present at a frequency if engine knock is present at the frequency.

7. The method of claim 4, further comprising:
   receiving a second signal from a second knock sensor disposed on the anti-thrust face of the cylinder; and
   subtracting the second signal from the first signal to derive a piston slap signal.

8. A system, comprising:
   a controller configured to control a reciprocating device, wherein the controller comprises a processor configured to:
      obtain a fundamental frequency of a cylinder, the cylinder comprising a thrust face and an anti-thrust face;
      receive a first signal from a first knock sensor disposed on the cylinder;
      determine whether piston slap is present, by evaluating whether a plurality of amplitudes of the first signal at the fundamental frequency and one or more harmonic frequencies of the fundamental frequency exceed a piston slap threshold value; and
      determine whether engine knock is present, by evaluating whether the plurality of amplitudes do not decrease as the one or more harmonic frequencies increase.

9. The system of claim 8, wherein the one or more harmonic frequencies comprise first, second, third, fourth, fifth, and sixth harmonic frequencies.

10. The system of claim 8, wherein the first knock sensor is disposed on the thrust face of the cylinder, and is oriented perpendicular to an axis of piston travel within the cylinder.

11. The system of claim 10, wherein the processor is further configured to provide a user perceptible indication of the presence of piston slap.

12. The system of claim 10, wherein the processor is further configured to:
   receive a second signal from a second knock sensor disposed on the anti-thrust face of the cylinder; and
   subtract the second signal from the first signal to derive a piston slap signal.

13. A non-transitory computer readable medium comprising executable instructions that when executed cause a processor to:
   obtain a fundamental frequency of a cylinder, the cylinder comprising a thrust face and an anti-thrust face;
   receive a first signal from a first knock sensor disposed on the thrust face of the cylinder;
   determine whether piston slap is present, by evaluating whether a plurality of amplitudes of the first signal at the fundamental frequency and one or more harmonic frequencies of the fundamental frequency exceed a piston slap threshold value; and
   determine whether engine knock is present, by evaluating whether the plurality of amplitudes do not decrease as the one or more harmonic frequencies increase.

14. The non-transitory computer readable medium comprising executable instructions of claim 13, wherein the first knock sensor is oriented perpendicular to an axis of piston travel within the cylinder.

15. The non-transitory computer readable medium comprising executable instructions of claim 13, wherein the processor is further configured to:
   receive a second signal from a second knock sensor disposed on the anti-thrust face of the cylinder; and
   subtract the second signal from the first signal to derive a piston slap signal.

16. The non-transitory computer readable medium comprising executable instructions of claim 13, wherein the one or more harmonic frequencies are integer multiples of the fundamental frequency.

17. The non-transitory computer readable medium comprising executable instructions of claim 13, wherein the processor is further configured to provide a user perceptible indication of the presence of piston slap.

* * * * *